United States Patent
Saito et al.

(10) Patent No.: US 11,285,431 B2
(45) Date of Patent: Mar. 29, 2022

(54) ACID GAS REMOVAL APPARATUS AND METHOD

(71) Applicant: KABUSHIKI KAISHA TOSHIBA, Tokyo (JP)

(72) Inventors: Hitomi Saito, Kawaguchi (JP); Kenji Sano, Inagi (JP); Toshihiro Imada, Kawasaki (JP); Akiko Suzuki, Ota (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 62 days.

(21) Appl. No.: 17/012,793

(22) Filed: Sep. 4, 2020

(65) Prior Publication Data

US 2021/0275959 A1  Sep. 9, 2021

(30) Foreign Application Priority Data

Mar. 9, 2020 (JP) .................. JP2020-040120

(51) Int. Cl.
  *B01D 53/14* (2006.01)
  *B01D 53/18* (2006.01)
  *B01D 53/62* (2006.01)
  *B01D 53/78* (2006.01)

(52) U.S. Cl.
  CPC ..... *B01D 53/1425* (2013.01); *B01D 53/1475* (2013.01); *B01D 53/18* (2013.01); *B01D 53/62* (2013.01); *B01D 53/78* (2013.01); *B01D 2252/204* (2013.01); *B01D 2257/504* (2013.01); *B01D 2258/0283* (2013.01)

(58) Field of Classification Search
  CPC .... B01D 15/00; B01D 19/00; B01D 53/1462; B01D 53/1468; B01D 53/1475; B01D 53/52; B01D 53/526; B01D 53/62; B01D 53/78; B01D 53/96; B01D 2215/00; B01D 2251/604; B01D 2257/304; B01D 2257/504; B01D 2258/0283; C01P 2002/22
  See application file for complete search history.

(56) References Cited

U.S. PATENT DOCUMENTS

| | | | | |
|---|---|---|---|---|
| 3,539,306 A | * | 11/1970 | Kimiaki .................. | C01F 7/005 423/432 |
| 9,278,308 B2 | | 3/2016 | Jamtvedt et al. | |
| 9,586,175 B2 | * | 3/2017 | Idem ...................... | B01D 53/40 |
| 10,000,383 B2 | | 6/2018 | Watanabe et al. | |
| 2013/0108532 A1 | | 5/2013 | Idem et al. | |
| 2014/0284521 A1 | | 9/2014 | Deguchi et al. | |

FOREIGN PATENT DOCUMENTS

| | | | | |
|---|---|---|---|---|
| GB | 2010 015 603 | * | 10/2010 | ........ B01J 20/28004 |
| GB | 2 483 801 A | * | 3/2012 | ............. B01D 53/02 |
| JP | WO 2014/192381 A1 | | 12/2014 | |
| JP | 5759566 B2 | | 8/2015 | |
| JP | 6147339 B2 | | 6/2017 | |
| JP | 6180411 B2 | | 8/2017 | |
| KR | 2020 056 343 A | * | 5/2020 | ............. B01D 53/02 |

OTHER PUBLICATIONS

Toshiyuki Hibino, "Synthesis and Applications of Hydrotalcites" Research Institute for Environmental Management Technology, vol. 45, 2006, pp. 102-109.

Eiichi Narita, "Intercalation Property of Layered Double Hydroxides and Its Applications" Department of Frontier Materials and Function Engineering, vol. 46, 2007, pp. 207-218.

M. Nayak, et al., "Preparation of the Layered Double Hydroxide (LDH) $LiAl_2(OH)_7 \cdot 2H_2O$, by Gel to Crystallite Conversion and a Hydrothermal Method, and its Conversion to Lithium Aluminates" J. Mater. Chem., vol. 7, No. 10, 1997, pp. 2131-2137.

Michael C. Stern, "Electrochemically-Mediated Amine Regeneration for Carbon Dioxide Separations" Dr. Thesis at MIT, Massachusetts Institute of Technology, 2011, 200 pages.

Huancong Shi, et al., "Catalytic and Non Catalytic Solvent Regeneration During Absorption-Based $CO_2$ Capture with Single and Blended Reactive Amine Solvents" International Journal of Greenhouse Gas Control, vol. 26, 2014, pp. 39-50.

Xin Zhang, et al., "$CO_2$ Desorption in Single and Blended Amine Solvents with and without Catalyst" Energy Procedia, vol. 114, 2017, pp. 1862-1868.

Jiawei Wang, et al., "Preparation and $CO_2$ Adsorption of Amine Modified Mg—Al LDH Via Exfoliation Route" Chemical Engineering Science, vol. 68, 2012, pp. 424-431.

Supreeth Nagendran, et al., "Synthon Approach to Structure Models for the Bayerite-Derived Layered Double Hydroxides of Li and Al" Inorganic Chemistry, vol. 56, 2017, pp. 5026-5033.

* cited by examiner

Primary Examiner — Timothy C Vanoy

(74) Attorney, Agent, or Firm — Oblon, McClelland, Maier & Neustadt, L.L.P.

(57) ABSTRACT

The embodiment provides a composite that allows the release of acid gas, even the continuous release of acid gas, at low temperature and with a high acid-gas release rate in a regeneration tower of an acid gas removal apparatus, and a regenerator and an acid gas removal apparatus, in both of which the composite is used, and a method of acid gas removal. The composite according to the embodiment is capable of separating an acid gas from an acid gas absorbent, which has absorbed the acid gas, to regenerate the acid gas absorbent, wherein the composite contains an inorganic layered compound and an aluminum-containing oxide. Also provided are a regenerator using the composite to regenerate an acid gas absorbent that has absorbed an acid gas by allowing the acid gas absorbent to release the acid gas, and an acid gas removal apparatus equipped with the regenerator.

14 Claims, 4 Drawing Sheets

ACID GAS REMOVAL APPARATUS AND METHOD

CROSS-REFERENCE TO RELATED APPLICATIONS

This application is based upon and claims the benefit of priority from the prior Japanese Patent Application No. 2020-040120, filed on Mar. 9, 2020, and the entire contents of which are incorporated herein by reference.

FIELD

The presented embodiment is related to the acid gas removal apparatus and the acid gas removal method of acid, separating and removing acid gases, such as carbon dioxide, from the acid gas absorbent which absorbed acid gases, and regenerating the acid gas absorbent.

BACKGROUND

The technology to allow acid gases, such as carbon dioxide, to be absorbed by an amine-containing acid gas absorbent is used in industrial plants, such as thermal power plants, with CCS (carbon dioxide capture and storage), and is considered as a most promising candidate for stopping global warming. The acid gas absorbent which absorbed acid gases is generally heated in a regeneration tower to be released the acid gases, and thereby regenerated for repeated use. The temperature used in this process is generally 140° C., and huge energy is consumed for this process, which is called heat duty or energy penalty. Therefore, if acid gases can be efficiently released even when the heating temperature is set to a lower temperature, the amount of energy consumption can be reduced, which potentially facilitates the wide use of the technology as a means of preventing global warming.

Additionally, it is also known that a switchable polarity solvent, whose solubility is converted upon a certain stimulus, is used as the acid gas absorbent. The switchable polarity solvent includes a water-insoluble amine that is made soluble in water upon absorption of acid gases, such as carbon dioxide. Even if such a switchable polarity solvent is used, the heat treatment is needed to regenerate the acid gas absorbent, and energy saving is also required as in the case of CCS.

In general, when a strong acid is added to an acid gas absorbent with acid gas, the weak acid gas, such as carbon dioxide, is released according to acid strength. Heating is less required in this method, but the strong acid should be separated from the acid gas absorbent to avoid undesirable circulation of the strong acid within the industrial plants. Thus, this method is not suitable for regeneration of the absorbent. In addition, the acid gases are released by a stoichiometric reaction, which is completed in a short period of time and does not provide a continuous release of acid gas.

Therefore, the method mentioned above is not suitable for CCS plants, which is desired continuous operation.

Meanwhile, although the alternative method using a solid acid, a nitride, or an oxide have been developed for absorbent regeneration, further research have been required for efficient acid gas separation and removal at low temperature.

DETAILED DESCRIPTION

Figure 1:
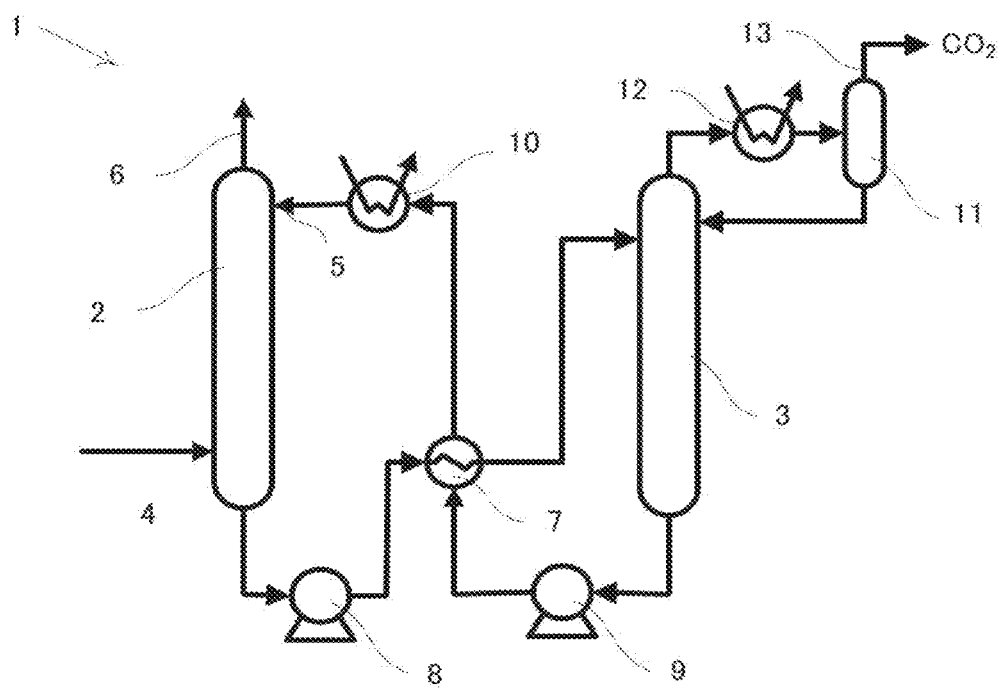
FIG. 1 shows a schematic diagram of an acid gas removal apparatus according to the embodiment.

A composite according to the embodiment is capable of separating an acid gas from an acid gas absorbent, which has absorbed the acid gas, to regenerate the acid gas absorbent, wherein the composite comprises an inorganic layered compound and an aluminum-containing oxide.

A regenerator according to the embodiment is a regenerator for acid gas absorbent regeneration that regenerates an acid gas absorbent that has absorbed an acid gas by allowing the acid gas absorbent to release the acid gas, wherein the acid gas absorbent that has absorbed an acid gas is brought into contact with the composite to separate the acid gas from the acid gas absorbent.

An acid gas removal apparatus according to the embodiment comprises:

an acid gas absorbent, an absorber that brings a subject gas mixture containing an acid gas into contact with the acid gas absorbent to make the acid gas absorbent absorb the acid gas and thereby to remove the acid gas from the subject gas mixture, and a regenerator that regenerates the acid gas absorbent that has absorbed the acid gas by allowing the acid gas absorbent to release the acid gas, wherein the acid gas absorbent regenerated by the regenerator is reused in the absorber, and the regenerator is the above regenerator.

Additionally, a method of acid gas removal according to the present embodiment comprises:

an acid gas removal step in which a subject gas mixture containing an acid gas is brought into contact with an acid gas absorbent to make the acid gas absorbent absorb the acid gas and thereby to remove the acid gas from the subject gas mixture, and an acid gas absorbent regeneration step in which the acid gas absorbent that has absorbed the acid gas is regenerated by allowing the acid gas absorbent to release the acid gas, wherein the regenerated acid gas absorbent is reused in the acid gas removal step, and wherein, in the acid gas absorbent regeneration step, the acid gas absorbent that has absorbed the acid gas is brought into contact with the composite comprising an inorganic layered compound and an aluminum-containing oxide to regenerate the acid gas absorbent.

Embodiments will now be explained with reference to the accompanying drawings.

<Acid Gas Removal Apparatus>

First, an acid gas removal apparatus suitable for using the composite according to the embodiment will be described.

The acid gas removal apparatus according to the embodiment comprises:

an acid gas absorbent, an absorber that brings a subject gas mixture containing an acid gas into contact with the acid gas absorbent to make the acid gas absorbent absorb the acid gas and thereby to remove the acid gas from the subject gas mixture, and a regenerator that regenerates the acid gas absorbent that has absorbed the acid gas by allowing the acid gas absorbent to release the acid gas, wherein the acid gas absorbent regenerated by regenerator is reused in the absorber.

Although the following embodiment mainly describes a case where the acid gas is carbon dioxide, an acid gas absorbent according to the embodiment can exert a similar effect on other acid gases, such as hydrogen sulfide. The acid gas absorbent according to the embodiment is suitable for absorption of acidic gases, such as carbon dioxide or hydrogen sulfide, especially for absorption of carbon dioxide, among those, and is appropriate for apparatuses to capture carbon dioxide from exhaust gases in factories.

The acid gas absorbent used in the acid gas removal apparatus contains an amine compound as a main agent to absorb acid gases. Such an amine compound can be selected appropriately from amine compounds that are conventionally and commonly used for acid gas absorbents, and be used.

The amine as a candidate is a primary amine, a secondary amine, or a tertiary amine. In addition, polyamine compounds, such as diamines or triamines, can be used. Furthermore, these amine derivatives can also be used, in which a hydrogen(s) is (are) substituted with, for example, hydroxy, or in which a methylene(s) is(are) substituted with, for example, oxy, carbonyl, or sulfonyl. Moreover, amines with high water solubility are preferred, though amine compounds are generally soluble in water. Switchable polarity solvents, which are originally insoluble in water, become water-soluble as a result of the reaction with an acid gas(es). This is also a type of amine compounds.

Specifically, the following amine compounds can be used:
(i) amino alcohols;
(ii) cyclic amines;
(iii) primary amines;
(iv) secondary amines;
(v) tertiary amines;
(vi) polyamines;
(vii) polyalkylene polyamines.

These classifications are for convenience purposes only and there may be a case where one material belongs to multiple classes.

Furthermore, because the acid gas absorbent is regenerated repeatedly by a method according to the embodiment, the compound is desired to have high stability. From these viewpoints, it is not preferred to use ammonia, methylamine, hydrazine, and the like.

The acid gas absorbent according to the embodiment is a solution in which water is contained as a solvent and the above amine compound coexists.

In general, the amine concentration is preferred to be high from the point of energy consumption, plant size-equipment, and processing efficiency. This is because the amount of carbon dioxide absorption or release per unit volume of the absorbent is high, and the rate of carbon dioxide absorption or release is also high.

However, an extremely high concentration of the amine may result in an increase in the viscosity of the absorbent. Moreover, when the content of the amine is not less than 5% by mass, a sufficient amount or rate of carbon dioxide absorption can be achieved, which can provide excellent processing efficiency.

Acid gas absorbents containing amine whose content is within mentioned above have an advantage of being efficient in carbon dioxide capture, because such absorbents can increase not only the amount of carbon dioxide but also the rate of carbon dioxide in absorption and release.

The acid gas absorbent according to the embodiment contains the above amine and water, and can contain other optional components as necessary.

The optional components include, for example, an antioxidant, a pH modifier, an antifoam, and an anticorrosive.

Preferred specific examples of the antioxidant can include dibutylhydroxytoluene (BHT), butylhydroxyanisole (BHA), sodium erythorbate, sodium nitrite, sulfur dioxide, 2-mercaptoimidazole, and 2-mercaptobenzimidazole. When an antioxidant is used, the content of the antioxidant is preferably from 0.01 to 1% by mass, particularly preferably from 0.1 to 0.5% by mass (the total amount of the acid gas absorbent is considered as 100% by mass). The antioxidant can prevent the deterioration of the acid gas absorbent and increase the lifetime of the acid gas absorbent.

Preferred specific examples of the antifoam can include silicone-based antifoams and organic antifoams. When an antifoam is used, the content of the antifoam is preferably from 0.00001 to 0.001% by mass, particularly preferably from 0.0005 to 0.001% by mass (the total amount of the acid gas absorbent is considered as 100% by mass). The antifoam can prevent the foaming of the acid gas absorbent, suppress the reduction of acid gas absorption or release efficiency, and prevent a reduction in the fluidity or circulatory efficiency of the acid gas absorbent.

Preferred specific examples of the anticorrosive can include phosphate esters, tolyltriazoles, and benzotriazoles. When an anticorrosive is used, the content of the anticorrosive is preferably from 0.00003 to 0.0008% by mass, particularly preferably from 0.00005 to 0.005% by mass (the total amount of the acid gas absorbent is considered as 100% by mass). Such an anticorrosive can prevent corrosion of the plant equipment and increase the lifetime of the plant equipment.

FIG. 1 shows a schematic diagram of an acid gas removal apparatus according to the embodiment.

The acid gas removal apparatus 1 comprises an absorber 2 that brings a subject gas mixture containing an acid gas (for example, exhaust gas) into contact with an acid gas absorbent which circulates in the apparatus to absorb and remove the acid gas from the subject gas mixture, and a regenerator 3 that regenerates an acid gas absorbent that has absorbed an acid gas by separating the acid gas from the acid gas absorbent. As an example, a case where carbon dioxide is the acid gas is described below.

As shown in FIG. 1, an exhaust gas containing carbon dioxide, such as combustion exhaust gases emitted from, for example, thermal power plants, is directed to the bottom of the absorber 2 through a gas feeding port 4. The exhaust gas is confined in the absorber 2 and is brought into contact with an acid gas absorbent supplied through an acid gas absorbent feeding port 5 at the top of the absorber 2. As the acid gas absorbent, the above acid gas absorbent is used.

Additionally, the acid gas absorbent may contain other compounds, such as a nitrogen-containing compound for increasing the carbon dioxide absorption performance, an antioxidant, and a pH modifier, in arbitrary ratios, in addition to the above amine compound, a water-soluble salt(s), and a solvent such as water.

As described above, upon contact of the exhaust gas with the acid gas absorbent, the carbon dioxide in the exhaust gas is absorbed by the acid gas absorbent and is ideally completely removed. The exhaust gas from which carbon dioxide has been removed is emitted through a gas exhaust port 6 to the outside of the absorber 2.

The acid gas absorbent with absorbed carbon dioxide is sent to a heat exchanger 7 and further to the regenerator 3 by a rich-liquid pump 8. The acid gas absorbent sent to the inside of the regenerator 3 is transferred from the top to the bottom of the regenerator 3, during which the acid gas absorbent is heated to allow the release of the acid gas in the acid gas absorbent and thereby to regenerate the acid gas absorbent.

The acid gas absorbent regenerated in the regenerator 3 is sent to the heat exchanger 7 and further to an absorbent cooler 10 by a lean-liquid pump 9, and then given back to the absorber 2 through the acid gas absorbent feeding port 5.

In contrast, the acid gas separated from the acid gas absorbent is brought into contact with reflux water at the top of the regenerator 3, which is provided from a reflux drum 11, and is then discharged to the outside of the regenerator 3.

In the embodiment, the regenerator 3 regenerates an acid gas absorbent by bringing the acid gas absorbent into contact with the composite to ideally completely separate acid gases from the acid gas absorbent. In other words, the acid gas removal apparatus according to the embodiment includes an acid gas separation apparatus in which any aqueous solution containing an amine compound, an acid gas, and water was brought into contact with the composite to separate the acid gas from the aqueous solution.

In the embodiment, the composite comprises an inorganic layered compound and an aluminum-containing oxide.

In the embodiment, the inorganic layered compound is a compound with a layered structure, in which metal hydroxide sheets with intercalated interlayer water and anions are stacked. In particular, compounds with metal hydroxide sheets are also called layered double hydroxides (LDHs). In the embodiment, it is believed that anions derived from an acid gas are intercalated between the sheets upon contact with an acid gas absorbent that has absorbed the acid gas, which enables separation of the acid gas from the absorbent. Such inorganic layered compounds can be classified into ion-exchangeable layered compounds and molecular layered compounds, and ion-exchangeable layered compounds are further classified into cation-exchangeable layered compounds and anion-exchangeable layered compounds. In the embodiment, an anion-exchangeable layered compound corresponding to anions from the acid gas is preferably used, and can be used in combination with other layered compounds depending on the components in a subject gas mixture as a target, the components contained in the absorbent, and the like.

As the anion-exchangeable layered compound, a hydrotalcite-like compound can be used. Various hydrotalcite-like compounds are known with divalent and trivalent metal ions, with univalent and trivalent metal ions, and with divalent and tetravalent metal ions. In the embodiment, among those, hydrotalcite-like compounds with univalent and trivalent metal ions and hydrotalcite-like compounds with divalent and trivalent metal ions are preferred. Specifically, in the embodiment, an inorganic layered compound represented by the following general formula (HT-a) or (HT-b) is preferably used:

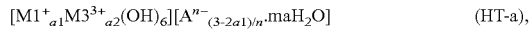  (HT-a),

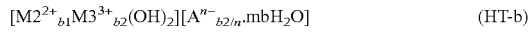  (HT-b)

(wherein
$M1^+$ represents a univalent metal ion;
$M2^{2+}$ represents a divalent metal ion;
$M3^{3+}$ represents a trivalent metal ion;
$A^{n-}$ represents an anion with a valence of n;
$0.70 \leq a1 \leq 1.00$;
$2.7 \leq (a1+a2) \leq 3.3$;
$0.10 \leq b2 \leq 0.40$;
$0.90 \leq (b1+b2) \leq 1.1$; and
ma and mb are numbers each representing the amount of interlayer water).

In this respect, $M1^+$ represents a univalent metal ion and is preferably at least one metal ion selected from the group consisting of $Li^+$, $Na^+$, $K^+$, $Rb^+$, and $Cs^+$, and is more preferably $Li^+$. The presence of $Li^+$ increases the affinity for carbon dioxide and is expected to increase the adsorption performance.

Additionally, $M2^{2+}$ represents a divalent metal ion and is preferably at least one metal ion selected from the group consisting of $Mg^{2+}$, $Ca^{2+}$, $Zn^{2+}$, $Fe^{2+}$, $Cu^{2+}$, $Mn^{2+}$, $Ni^{2+}$, and $Co^{2+}$.

Additionally, $M3^{3+}$ represents a trivalent metal ion and is preferably at least one metal ion selected from the group consisting of $Al^{3+}$, $Cr^{3+}$, $Fe^{3+}$, $Co^3$, $Ga^{3+}$, $V^{3+}$, and $In^{3+}$, and is more preferably $Al^{3+}$. The presence of $Al^{3+}$ makes the crystal structure of the LDH layers more robust and allows easy handling of the resulting adsorbent.

$A^{n-}$ is not specifically limited, but is preferably, for example, $OH^-$, $Cl^-$, $Br^-$, $CO_3^{2-}$, $NO_3^-$, or $SO_4^{2-}$. These anions are generally anions derived from the metal salts that are used for the synthesis. In addition, $A^{n-}$ may be, for example, a metal complex ion, a polyacid ion, or an anionic organic substance.

Additionally, a1 and a2, or b1 and b2 are the numbers representing the content ratio of the two metal ions contained in the inorganic layered compounds. Since these inorganic layered compounds are considered as hydroxides of univalent or divalent metal ions with substitution of trivalent metal ions for some of the metal ions in the crystals of the hydroxides, these numbers can be considered as the substitution ratio between the metal ions. In this respect, though the following conditions are stoichiometrically satisfied: at +a2=3; b1+b2=1, the total number of cations is not completely consistent with the stoichiometric values because of the lack of some cations due to, for example, the substitution.

In the embodiment, the value of a1 is not less than 0.70 and not more than 1.00, preferably not less than 0.80 and not more than 1.00. When the value of a1 is within the above range, any $M3^{3+}_{3-a1}(OH)_6$ in an amorphous form is transformed to an LDH and $M1^+$ ions are incorporated into the crystal lattice. In addition, the value of a1 is more preferably not less than 0.9 and not more than 1.00. When the value of a1 is within the above range, preferably, the crystallinity of the LDH is significantly improved. If the value of a is less than 0.70, undesirably, $Li^+$ ions are not incorporated into the structure and the amorphous substance is not able to be transformed to an LDH. Since the theoretical value of a1 is 1.00, the value of a1 shall not be more than 1.00.

The value of b2 is not less than 0.10 and not more than 0.40, preferably not less than 0.10 and not more than 0.33. When the value of b2 is within the above range, LDH layers are positively charged to have ion exchange capacity. In addition, the value of b2 is more preferably not less than 0.20 and not more than 0.33. When the value of b2 is within the above range, preferably, the amount of substituted $M3^{3+}$ is increased and the ion exchange capacity is improved. If the value of b2 is not more than 0.10, undesirably, the amount of substituted $M3^{3+}$ is decreased and the ion exchange capacity of LDH layers is reduced. If the value of b2 is not less than 0.33, undesirably, the amount of substituted $M3^{3+}$ is too large and oxides of $M3^{3+}$ are produced as a byproduct.

Hydrotalcite-like compounds are anion-exchangeable inorganic layered compounds in which some of the constitutive metal ions in the metal hydroxide sheets are substituted with other metal ions with a higher valence to form positively charged metal hydroxide layers, which allows adsorption of anions between the metal hydroxide sheets. For example, in compounds represented by the formula (HT-b), some of the divalent metal ions are substituted with trivalent metal ions, and it is considered that the adsorption capacity increases when the amount of substituted trivalent metal ions, namely the value of b2, is increased. The same applies to compounds represented by the formula (HT-a), and the adsorption capacity tends to increase with a larger value of a2. In addition, the physical properties of inorganic layered compounds are changed depending on the species of M1 and M2. Thus, the amount of released carbon dioxide is changed depending on the species of M1 and M2. Multiple combinations of metal ions are available for hydrotalcite-like compounds, including not only combinations of univalent and trivalent metal ions and of divalent and trivalent metal ions, but also, for example, combinations of divalent and tetravalent metal ions as described above and, furthermore, of univalent and tetravalent metal ions. Moreover, inorganic layered compounds represented by the formula (HT-a) are more preferred because such compounds tend to increase the electric charge on sheets and are expected to increase the anion absorption capacity. In addition, the affinity between an inorganic layered compound and carbonate ions is very important in CCS plants because an acid gas (carbon dioxide) is converted to carbonate ions in an absorbent, so that hydrotalcite-like compounds represented by the formula (HT-a) are preferred because of their particularly high affinity for carbonate ions. Hydrotalcite-like compounds with Li ions as $M1^+$ and Al ions as $M3^{3+}$ are particularly preferred. This is considered to be because the size balance between Li and Al ions is suitable to stabilize the crystal structure of LDH layers and to increase the adsorption capacity. A higher aluminum content is more desirable from the viewpoint of stabilizing the LDH structure.

Additionally, an efficient contact between an inorganic layered compound and an acid gas absorbent in a regeneration tower is important for rapid regeneration of the acid gas absorbent. For example, the rapid regeneration of an acid gas absorbent is enabled by micronizing an inorganic layered compound or allowing the conjugation of an inorganic layered compound with a metal oxide to increase the area of contact with the acid gas absorbent. However, the conjugation with a metal oxide is preferred to the micronization of an inorganic layered compound because micronization tends to promote the degradation of an inorganic layered compound.

As a metal oxide combined with an inorganic layered compound, an aluminum-containing oxide is used. Such an oxide may be a complex oxide that further contains, in addition to aluminum oxide, a metal(s) other than aluminum, such as, for example, at least one metal selected from the group consisting of Ti, Si, and Ce. The aluminum content is preferably not less than 90% by mole, more preferably not less than 95% by mole, with respect to the total amount of metals contained in an aluminum-containing oxide. This is because an increase in the content of an element(s) other than aluminum in an aluminum-containing oxide results in substitution of the element(s) other than aluminum from the metal oxide to a hydrotalcite-like compound, which is considered to reduce the crystallinity of the hydrotalcite-like compound.

Additionally, the aluminum-containing oxide is preferably porous. The surface area of the metal oxide is increased due to the porous structure, which in turn increases the efficiency of the reaction to release the acid gas. Specifically, the specific surface area of the metal oxide is preferably 30 $m^2/g$, more preferably 100 $m^2/g$.

Such a composite can be generated by any method. For example, such a composite can be generated by mixing an inorganic layered compound in powder form with a metal oxide powder, or by modifying the mixing ratio of metal compounds as raw materials for the synthesis of an inorganic layered compound itself. That is, the excess amount of either metal is converted to a metal oxide during the course of reaction, which is directly attached to an inorganic layered compound to form a composite.

The amount of an aluminum-containing oxide contained in the composite can be appropriately changed to modify the ability to separate acid gases from an acid gas absorbent, and the percentage of the aluminum-containing oxide with respect to the total mass of the composite is generally preferred to be from 1 to 80% by mass, more preferably from 1 to 50% by mass, still more preferably from 1 to 30% by mass, particularly preferably from 5 to 20% by mass.

Additionally, the presence of an inorganic layered compound and an aluminum-containing oxide in the composite can be confirmed by the XRD profile of the composite, which is determined by an X-ray diffraction (XRD) measurement. In the XRD profile of an inorganic layered compound, sharp diffraction lines appear in the range of diffraction angle 2θ, for example, from 10 to 15°, from 20 to 25°, and from 35 to 40° as a sign of "A" shown in FIG. 2, while in the XRD profile of an aluminum-containing metal compound, a broad diffraction line appears in the range of diffraction angle 2θ from 40 to 45° as an area surrounded with a square frame shown in FIG. 2. The broad diffraction line has half-value widths (not less than 1.0) broader than the half-value widths of the diffraction lines appearing in the range, for example, from 10 to 15°, from 20 to 25°, and from 35 to 40° (not less than 0.1 and not more than 0.9). In the composite according to the embodiment, the ratio of the maximum intensity $I_2$ of the broad diffraction line appearing in the range from 40 to 45°, which correspond to a metal oxide, to the maximum intensity $I_1$ of the diffraction line appearing in the range of diffraction angle 2θ from 10 to 15°, which correspond to an inorganic layered compound, is preferably from 0.1 to 1, further preferably from 0.5 to 1. In the present embodiment, the XRD profile can be determined by a commercially available measuring instrument. For example, the Ultima IV manufactured by Rigaku Corporation is an example of the X-ray measuring instrument. The measurement can be performed by exposure of the composite in powder form to X-rays with a tube voltage of 40 mV and a tube current of 40 mA.

The presence of the broad diffraction line in the XRD profile indicates the presence of an amorphous compound in the composite according to the embodiment.

Additionally, once the composite according to the embodiment is observed with a scanning electron microscope (SEM), a number of multilayer laminar structures characteristic of the inorganic layered compound are observed, and scattered spots of the alumina-containing oxide are locally found. The composite according to the embodiment preferably has platy or laminar structures derived from the inorganic layered compound. With a compound structure consisting of randomly stacked platy or laminar structures, the composite has an increased number of active sites exposed on the surface of the composite, which facilitates adsorption of carbon dioxide, as compared to a compound structure consisting of regularly stacked platy or laminar structures.

The alumina-containing oxide (amorphous alumina) is preferably observed in not less than 10% and not more than 100%, further preferably not less than 50% and not more than 100%, of all fields in average at 10 observation locations, when SEM observation images are captured at the 10 randomly selected locations and each of the observation images is subdivided vertically and horizontally at regular intervals into 9 fields and the percentage of fields showing the alumina-containing oxide together with platy or laminar structures derived from the inorganic layered compound is calculated on a location basis. This is because a less uneven distribution of the alumina-containing oxide in the composite leads to reduce uneven distribution of active and inactive sites in the composite, which can increase the efficiency of the reaction. In the observation, an SEM with, for example, but not limited to, a magnification of 5000 times and an accelerating voltage of 3.0 kV can be used for the observation, and the magnification may be adjusted to a level that allows resolution of details in the composite according to the embodiment. While the entirety of an observation object is observed by the aforementioned XRD profile, a local distribution of platy or laminar structures and of block structures derived from the alumina-containing oxide is observed by the SEM. In addition, diffraction lines with very high intensities are obtained in an XRD profile from even a small amount of a sample with a high crystallinity, which may cause the measurement result from the XRD to be inconsistent with the observation result from the SEM.

The composite according to the embodiment can be formed into a desired shape and then used. Specifically, the composite formed into, for example, a rod-like, a slab, a granular, a mesh, a string, or a fluffy shape can be used. For example, the composite in a granular shape can be placed in a bag made of Teflon™ mesh and hung inside the regeneration tower, or the composite in a slab shape can be directly placed in the regenerator. The composite may also be attached to a metal or glass plate in some way. In addition, the composite can be detached from the regenerator as needed for regeneration because deterioration of the composite tends to occur in association with the operation of the apparatus. Thus, the composite is preferably formed into a shape that facilitates attachment and detachment of the composite, particularly a granular shape, a slab shape, or a mesh shape.

Additionally, the amount of the composite placed in the regenerator is preferably adjusted depending on the amount of an acid gas absorbent contained in the regenerator. That is, not the amount of the acid gas circulating in the apparatus, but the amount of an acid gas absorbent existing in the regenerator at one time point during the operation of the apparatus is preferably used as a reference for the adjustment. Specifically, the amount of the composite is preferably from 1 to 10 g per 100 g of an acid gas absorbent contained in the regenerator.

Specific examples of the composite include hydrotalcite-$Al_2O_3$.

The reflux water with dissolved carbon dioxide is cooled down by a reflux cooler 12, and then separated at the reflux drum 11 from a liquid component formed by condensation of water vapor with carbon dioxide. The liquid component is directed to an acid gas capture step through an acid gas capture line 13. Meanwhile, the reflux water separated from the acid gas is sent to the regenerator 3.

By the acid gas removal apparatus 1 according to the present embodiment, highly efficient absorption and removal of acid gases can be provided using an acid gas absorbent with excellent acid gas absorption and release properties.

<Acid Gas Removal Method>

A method of acid gas removal according to the embodiment comprises:

bringing a subject gas mixture containing an acid gas into contact with an acid gas absorbent to remove the acid gas from the subject gas mixture; and bringing the acid gas absorbent that has absorbed the acid gas into contact with the composite to allow the release of the acid gas and thereby to regenerate the acid gas absorbent; wherein the regenerated acid gas absorbent is reused.

The basic configuration of the acid gas removal method according to the embodiment comprises the steps of: bringing the subject gas mixture into contact with the acid gas absorbent to make the acid gas absorbent absorb the acid gas (acid gas absorption step); and heating the acid gas absorbent obtained in the above acid gas absorption step, which has absorbed an acid gas, to allow the release and removal of the acid gas (acid gas separation step).

The method for bringing a gas mixture containing an acid gas into contact with an aqueous solution containing the above acid gas absorbent is not specifically limited, but the contact can be performed by, for example, a method in which the absorbent is made to absorb the acid gas by allowing the gas mixture containing the acid gas to bubble into the acid gas absorbent, a method in which the acid gas absorbent is sprayed into a stream of the gas mixture containing the acid gas (by atomizing or spraying), or a method in which the gas mixture containing the acid gas is brought into countercurrent contact with the acid gas absorbent in the absorber including a filler made of a porcelain or metal mesh.

When the gas mixture containing the acid gas is absorbed by the aqueous solution, typically, the temperature of the acid gas absorbent is preferably in the range from room temperature up to 60° C., more preferably up to 50° C., particularly preferably from 20 to 45° C. The amount of absorbed acid gas is increased at a lower temperature, but the lower limit of the processing temperature can be determined according to, for example, the temperature of the gas mixture during the process, and the targeted heat recovery.

Typically, the pressure during the acid gas absorption is nearly the atmospheric pressure. Although a higher pressure can be applied to enhance the absorption performance, the method is preferably conducted under the atmospheric pressure to reduce the energy consumption required for the condensation.

In the embodiment, the method to separate an acid gas from the acid gas absorbent that has absorbed the acid gas and to capture pure or highly concentrated carbon dioxide includes a method in which the temperature of the absorbent is increased to a temperature higher than that during the acid gas absorption while the liquid interface is expanded in the regeneration tower including the composite.

In the embodiment, the temperature of the acid gas absorbent during the acid gas separation can be lower than the temperature used for commonly known regenerators. In commonly known acid gas removal apparatuses, the temperature is typically increased to 100 to 140° C. In acid gas removal apparatuses for thermal power plants, the thermal energy of steam generated in the thermal power plants is generally used as heating energy, and the thermal energy in such a case corresponds to around 10% of the total energy generated by the power generation at each thermal power plant. In the embodiment, the heating temperature in the regenerator is, for example, lower than 100° C., preferably not higher than 90° C., more preferably not higher than 85° C. The amount of released acid gas tends to be increased at higher temperature, but the amount of energy required to heat the absorbent is increased to raise the temperature. Thus, the temperature in the regenerator can be determined according to, for example, the temperature of the gas mixture during the process, and the targeted heat recovery. Typically, the pressure during the acid gas release can be around 1 to 3 atmospheres.

The purity of the acid gas captured as described above is normally as high as around 95 to 99% by volume. The pure acid gas or the highly concentrated acid gas can be used as a raw material for the synthesis of chemicals or polymers, a refrigerant for food freezing, and the like. Additionally, the captured acid gas can also be isolated and stored in, for example, underground environments by a currently developed method.

Among the above-described steps, the largest amount of energy is consumed in the step of regenerating an acid gas absorbent by separating an acid gas from the acid gas absorbent, which may generally account for about 50 to 80% of the energy required for the whole process. Thus, a reduction of energy consumption in the acid gas absorbent regeneration step can reduce the cost needed for the acid gas absorption and separation steps, and allow economically advantageous and efficient removal of acid gases from exhaust gases.

According to the present embodiment, the amount of energy required for the acid gas separation (the regeneration step) can be reduced by using the acid gas absorbent of the above embodiment, whereby the carbon dioxide absorption and separation steps can be efficiently performed under economically advantageous conditions.

EXAMPLES

Preparation Example

A Li—Al hydrotalcite-alumina composite (HT-1) used in Example 1 of the present invention was produced by, for example, the following method. After 11.13 g of lithium bromide monohydrate (manufactured by Tokyo Chemical Industry Co., Ltd.) was dissolved in pure water, 0.5 g of aluminum hydroxide (manufactured by Sigma-Aldrich Co. LLC) was dispersed in the resulting solution to prepare a starting liquid, and the starting liquid was subjected to hydrothermal synthesis under autogenous pressure at 140° C. for 24 hours in a pressure resistant vessel lined with Teflon. The obtained slurry was filtered, washed with water, and dried to obtain the Li—Al hydrotalcite-alumina composite HT-1: $[Li_{0.92}Al_{2.00}(OH)_6][Br]_{0.90} \cdot 1.87H_2O \cdot 0.18Al_2O_3$. In addition, the hydrotalcite HT-2 and the hydrotalcites HT-3 to HT-8, in which a divalent metal was substituted for Li, were also synthesized similarly. For example, after 2.89 g of magnesium chloride hexahydrate (manufactured by FUJIFILM Wako Pure Chemical Corporation) was dissolved in pure water, 0.37 g of aluminum hydroxide (manufactured by Sigma-Aldrich Co. LLC) was dispersed in the resulting solution, and the thus-obtained starting liquid was used for the Mg—Al hydrotalcite-alumina composite (HT-3).

Additionally, a Li—Al hydrotalcite (HT-R1), $[Li_{0.88}Al_{2.13}(OH)_6][Br]_{0.92} \cdot 1.83H_2O$, was synthesized in the same manner as the composite HT-1, except that $Al(OH)_3$ was reduced to 0.33 g, and a Mg—Al hydrotalcite (HT-R2) was similarly obtained.

Figure 2:
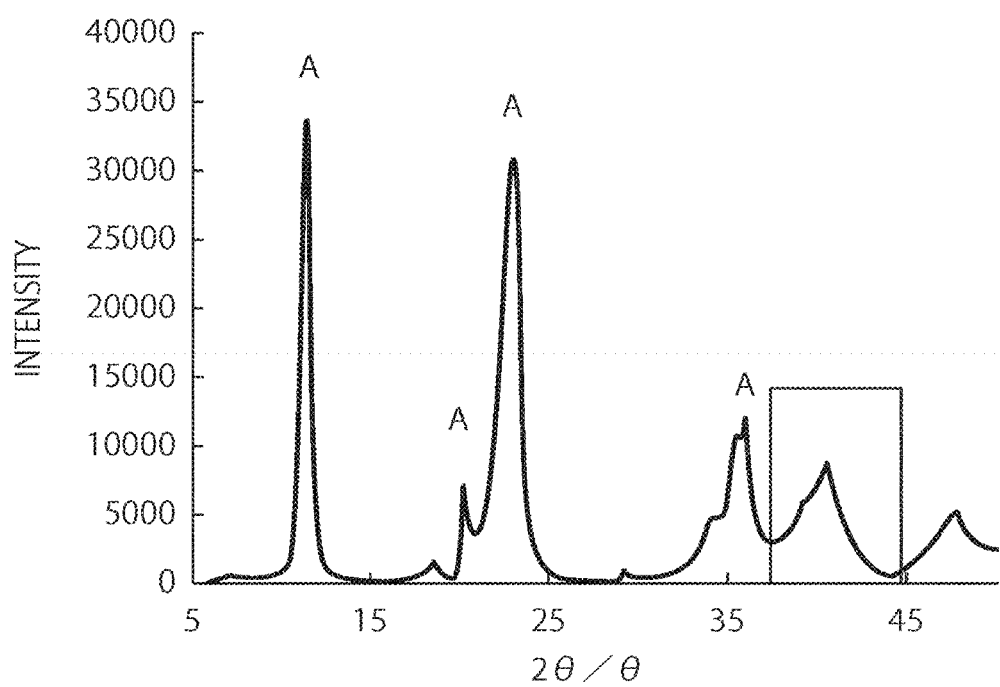
FIG. 2 shows an XRD profile of an inorganic layered compound according to the embodiment.

The XRD profile of the prepared composite HT-1 was as shown in FIG. 2. In the composite of amorphous alumina (an aluminum-containing oxide) and a Li—Al inorganic layered compound, a broad diffraction line (surrounded with a square in the figure) appears in the range from around 40 to 45°, in addition to diffraction lines appearing, for example, in the ranges from 10 to 15°, from 20 to 25°, and from 35 to 40° (with peaks marked with A in the figure), which are derived from the Li—Al inorganic layered compound. The broad diffraction line is derived from the amorphous alumina. The maximum peak intensity $I_1$ of the diffraction line in the range from 10 to 15° was about 34000, and the maximum peak intensity $I_2$ of the broad diffraction line in the range from around 40 to 45° was about 9000, from which the $I_2/I_1$ ratio of the composite was calculated to be about 0.26.

Figure 3:
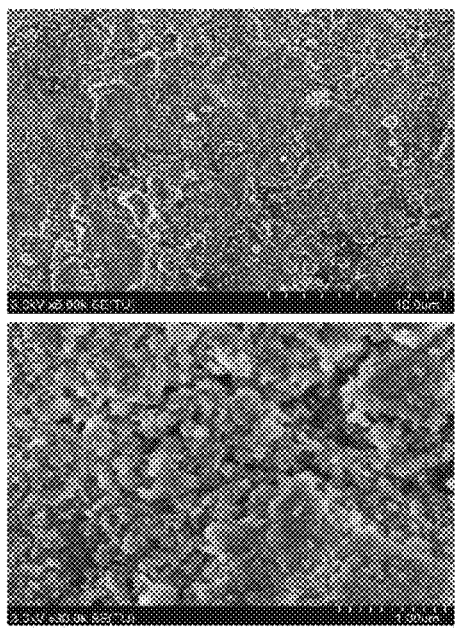
FIG. 3 shows SEM images of materials used in Comparative Example 2 and Example 1.
Figure 3:
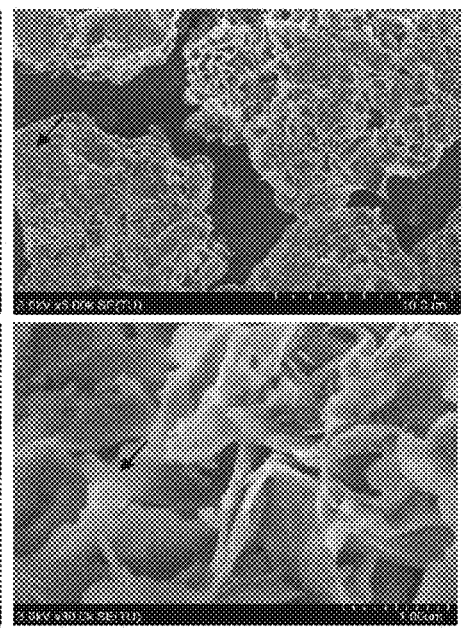

Moreover, SEM images of amorphous alumina (used in Comparative Example 2) and the composite HT-1 at magnifications of 5000 and 30000 times are shown in FIG. 3. In the composite HT-1, as shown in FIG. 3, a number of multilayer laminar structures characteristic of the Li—Al inorganic layered compound are observed, and scattered spots of amorphous alumina (arrows) are locally found. The identity of the substance at the specific spots as amorphous alumina can be confirmed based on the presence of aluminum and oxygen at the spots with a composition ratio of 2:3.

Figure 4:
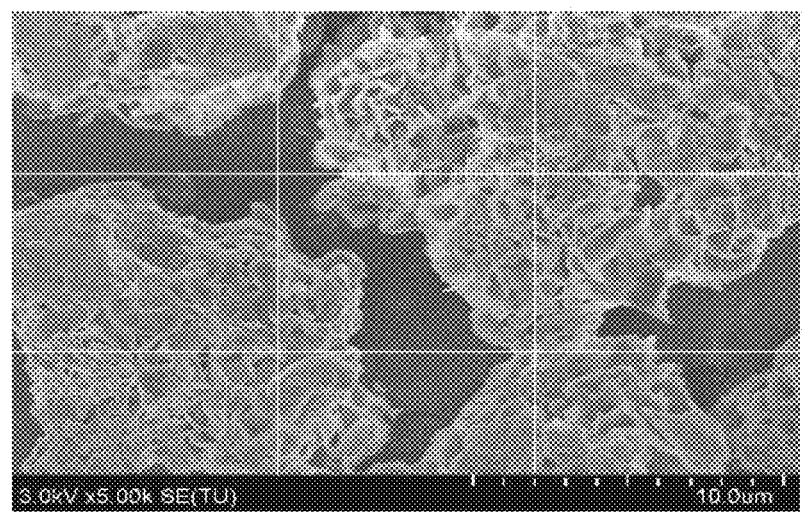
FIG. 4 shows an SEM image (9 subdivided fields) of a composite according to the embodiment.

Moreover, FIG. 4 shows an SEM image of the composite HT-1 (at a magnification of 5000 times), which is subdivided into 9 fields. In each composite according to the embodiment, block structures derived from an aluminum-containing oxide (amorphous alumina) can be observed. In the 9 fields subdivided vertically and horizontally at regular intervals as described above, platy structures derived from the inorganic layered compound and block structures derived from amorphous alumina are preferably observed in not less than 10% and not more than 100%, further preferably not less than 50% and not more than 100%, of all the fields.

Comparative Example 1

To a sample tube with a volume of 20 cc, 3 g of an acid gas absorbent with 33% by mass (7.8 mmol) of dimethylcyclohexylamine (DCHA) was introduced, and was allowed to absorb carbon dioxide until saturated. This acid gas absorbent contains 7.8 mmol of DCHA. DCHA is hardly soluble in water, and becomes soluble in water upon absorption of carbon dioxide, which indicates that DCHA has a property of a so-called polarity switchable material. Thus, the acid gas absorbent that has absorbed a sufficient amount of carbon dioxide is in a fully dissolved and homogeneous state. Subsequently, the sample tube was placed into a water bath at 80° C. for 25 minutes for heating, where 0.36 g of Nafion (about 11%) coexisted as a solid acid. During this period, the acid gas absorbent released carbon dioxide, which resulted in separation of the DCHA phase from the aqueous phase. The upper DCHA phase was collected and quantified to determine the amount of the released carbon dioxide, which corresponds to the amount of released carbon dioxide.

Comparative Examples 2 to 4

The same measurement as in Comparative Example 1 was performed, except that amorphous alumina (Comparative Example 2), HT-R1 (Comparative Example 3), or HT-R2 (Comparative Example 4) was used instead of Nafion and the heating temperature was set to 70° C.

Examples 1 to 9

The same measurement as in Comparative Example 1 was performed, except that each of the composites according to the embodiment, HT-1 to HT-8, was used instead of Nafion and the heating temperature was set to 70° C.

The same composite was used in Examples 1 and 2, but the heating time in Example 2 was shortened to 10 minutes. The composite of Example 3 is composed of the same ion species as in Example 1 but contains a more amount of an aluminum-containing oxide, which reduces the content ratio of a hydrotalcite-like compound. In Examples 4 to 9, the composites used contain ion species different from those in Example 1. The carbon dioxide release ratios in Example 1 to 9 are shown below, which are calculated based on the amount of released carbon dioxide in Comparative Example 1, which is set to 1.0.

TABLE 1

| LDH Content (%) | Alumina Appearance in SEM (%) | Temperature (° C.) | Time (min) | Carbon Dioxide Release (ratio) |
|---|---|---|---|---|
| — | — | 80 | 25 | 1 |
| — | 100 | 70 | 25 | 7.1 |
| 100 | 0 | 70 | 25 | 8.1 |
| 100 | 0 | 70 | 25 | 8.3 |
| 94 | 66 | 70 | 25 | 9.6 |
| 94 | 66 | 70 | 10 | 8.9 |
| 12 | 100 | 70 | 25 | 8.5 |
| 91 | 48 | 70 | 25 | 9.2 |
| 85 | 55 | 70 | 25 | 9.0 |
| 78 | 37 | 70 | 25 | 8.5 |
| 81 | 42 | 70 | 25 | 8.8 |
| 88 | 39 | 70 | 25 | 8.6 |
| 85 | 48 | 70 | 25 | 8.9 |

Table 1 indicated that the co-presence of an inorganic layered compound (a hydrotalcite-like compound) and an aluminum-containing oxide (amorphous alumina) resulted in an increase in the amount of released carbon dioxide. It was also indicated that the use of each composite according to the embodiment resulted in an increase in the amount of released carbon dioxide even during a short period of time, as compared to the Comparative Examples. In the Examples, the rate of increasing the amount of released carbon dioxide becomes higher with lower temperature and shorter period of time than those in the Comparative Examples.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the invention.

The invention claimed is:

1. A composite capable of separating an acid gas from an acid gas absorbent, regenerating the absorbent, and comprising an inorganic layered compound and an aluminum-containing oxide.

2. The composite according to claim 1, wherein the inorganic layered compound is a hydrotalcite-like compound.

3. The composite according to claim 1, wherein the inorganic layered compound is represented by the following general formula (HT-a) or (HT-b):

$$[M1^+_{a1}M3^{3+}_{a2}(OH)_6][A^{n-}_{(3-2a1)/n} \cdot maH_2O] \quad \text{(HT-a)},$$

$$[M2^{2+}_{b1}M3^{3+}_{b2}(OH)_2][A^{n-}_{b2/n} \cdot mbH_2O] \quad \text{(HT-b)}$$

(wherein
M1$^+$ represents a univalent metal ion;
M2$^{2+}$ represents a divalent metal ion;
M3$^{3+}$ represents a trivalent metal ion;
A$^{n-}$ represents an anion with a valence of n;
$0.70 \leq a1 \leq 1.00$;
$2.7 \leq (a1+a2) \leq 3.3$;
$0.10 \leq b2 \leq 0.40$;
$0.90 \leq (b1+b2) \leq 1.1$; and
ma and mb are numbers each representing the amount of interlayer water).

4. The composite according to claim 3, wherein the univalent metal ion (M1$^+$) is selected from the group consisting of Li$^+$, Na$^+$, K$^+$, Rb$^+$, and Cs$^+$, and
the divalent metal ion (M2$^{2+}$) is selected from the group consisting of Mg$^{2+}$, Ca$^{2+}$, Zn$^{2+}$, Fe$^{2+}$, Cu$^{2+}$, Mn$^{2+}$, Ni$^{2+}$, and CO$^{2+}$, and
the trivalent metal ion (M3$^{2+}$) is selected from the group consisting of Al$^{3+}$, Cr$^{3+}$, Fe$^{3+}$, Co$^{3+}$, Ga$^{3+}$, V$^{3+}$, and In$^{3+}$.

5. The composite according to claim 4, wherein the inorganic layered compound contains Li$^+$ as the univalent metal ion and Al$^{3+}$ as the trivalent metal ion.

6. The composite according to claim 1, wherein the aluminum-containing oxide further contains at least one metal selected from the group consisting of Ti, Si, and Ce.

7. The composite according to claim 1, wherein the aluminum-containing oxide is porous.

8. The composite according to claim 1, wherein, in an X-ray diffraction profile of the composite, the ratio ($I_2/I_1$) of the maximum intensity $I_2$ of a diffraction line in the 2θ range from 40 to 45° to the maximum intensity $I_1$ of a diffraction line in the 2θ range from 10 to 15° is from 0.1 to 1.0.

9. The composite according to claim 1, wherein the composite has platy or laminar structures derived from the inorganic layered compound.

10. The composite according to claim 1, wherein the composite has platy or laminar structures derived from the inorganic layered compound and powder structures derived from the aluminum-containing oxide.

11. A regenerator of regenerating an acid gas absorbent, comprising the composite according to claim 1, wherein the acid gas absorbent that has absorbed an acid gas is brought into contact with the composite to separate the acid gas from the acid gas absorbent.

12. An acid gas removal apparatus comprising:
an acid gas absorbent,
an absorber that brings a subject gas mixture containing an acid gas into contact with the acid gas absorbent to make the acid gas absorbent absorb the acid gas and thereby to remove the acid gas from the subject gas mixture, and
the regenerator according to claim 11,
wherein the acid gas absorbent regenerated by the regenerator is reused in the absorber.

13. A method of acid gas removal, comprising:

an acid gas absorption step in which a subject gas mixture containing an acid gas is brought into contact with an acid gas absorbent to make the acid gas absorbent absorb the acid gas and thereby to remove the acid gas from the subject gas mixture, and an acid gas separation step in which the acid gas absorbent that has absorbed the acid gas is regenerated by allowing the acid gas absorbent to release the acid gas, wherein the regenerated acid gas absorbent is reused in the acid gas absorption step, and wherein, in the acid gas separation step, the acid gas absorbent that has absorbed the acid gas is brought into contact with a composite comprising an inorganic layered compound and an aluminum-containing oxide to regenerate the acid gas absorbent.

14. The method according to claim 13, wherein the acid gas absorbent is brought into contact with the composite under a temperature condition of less than 100° C. in the acid gas removal step.

* * * * *